Nov. 22, 1938.  A. G. BUTLER  2,137,385
AIRCRAFT CONTROL SYSTEM
Filed April 16, 1937  2 Sheets-Sheet 1

INVENTOR
ARTHUR G. BUTLER.
BY
ATTORNEY

INVENTOR
ARTHUR G. BUTLER.
BY
ATTORNEY

Patented Nov. 22, 1938

2,137,385

UNITED STATES PATENT OFFICE 2,137,385

AIRCRAFT CONTROL SYSTEM

Arthur G. Butler, Buffalo, N. Y., assignor to Curtiss-Wright Corporation, a corporation of Delaware Application April 16, 1937, Serial No. 137,175

5 Claims. (Cl. 244—87)

This invention relates to control systems for aircraft.

An object of the invention is to provide a unitary control airfoil adapted to be placed around the rearward end of an aircraft fuselage, the airfoil being arranged for tilting in several directions to effect longitudinal and directional control of the aircraft.

A further object is to provide a control means to replace the conventional rudder and elevator organization.

Still another object is to provide a control system so organized as to represent a minimum of drag when the control element is in its normal neutral position, and likewise, to provide low drag even when vertical or horizontal turning maneuvers are being accomplished.

The invention is adapted for use in connection with the streamline fuselage of an aircraft, the fuselage being provided at its forward end with main supporting surfaces. The control system proper comprises an annular airfoil embracing the fuselage but radially spaced therefrom, the annular airfoil being pivoted for lateral and vertical tilting to effect the necessary aerodynamic control functions.

An alternative embodiment of the invention disposes with the customary fin and stabilizer, utilizing the annular airfoil in connection with a pivoted tail portion of the fuselage to accomplish both control and stabilizing functions.

Further objects will be apparent from a reading of the subjoined specification and claims, and from an examination of the accompanying drawings, in which similar numbers indicate like parts, and in which:

Figure 3:
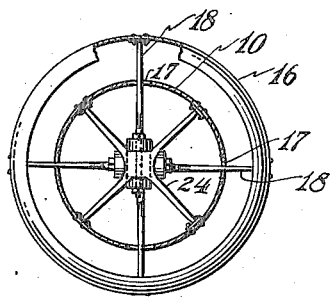
Fig. 3 is a section through the fuselage, looking aft toward the control elements.
Figure 4:
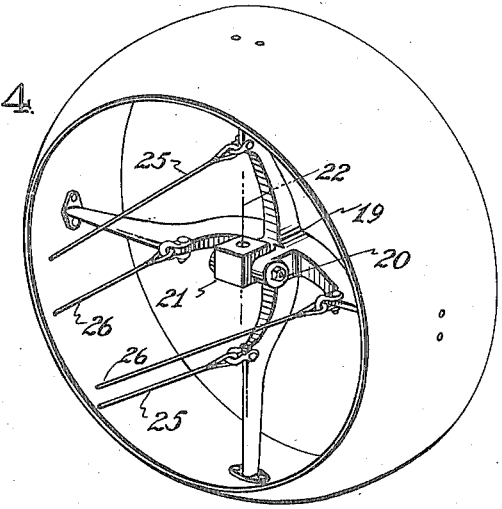
Fig. 4 is an enlarged perspective view of the annular control airfoil with its associated mechanism.

In the figures, I shown an airplane comprising an elongated streamline fuselage 10 of substantially circular cross-section, as shown in Fig. 3. The fuselage is provided with the conventional main supporting wings 11, a forwardly located power plant 12, and a suitable crew enclosure 13. At the rearward end of the fuselage 10 is fixedly attached a vertical fin 14 and a horizontal stabilizer 15, serving the usual function of providing directional and longitudinal stability for the aircraft.

For effecting directional and longitudinal control of the aircraft, an annular airfoil 16 is provided, this airfoil being substantially coaxial with the fuselage axis and being spaced throughout its periphery from the surface of the fuselage 10. Openings 17 are formed in the fuselage surface through which arms 18 extend, the arms carrying the airfoil 16 on their outer ends, and intersecting, within the fuselage 10, in a hub member 19. The member 19 is pivoted on a transverse axis, at 20, to a block 21, which in turn is pivoted on a vertical axis 22 to a member 23 rigidly mounted on the fuselage by arms 24 extending to the inner side of the surface covering thereof. It is contemplated that the structure shown is adapted for use with a monocoque fuselage.

Figure 1:
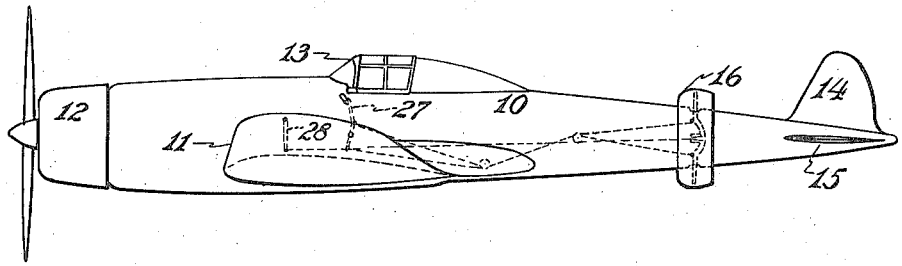
Fig. 1 is a side elevation of an aircraft embodying the control system of this invention.
Figure 2:
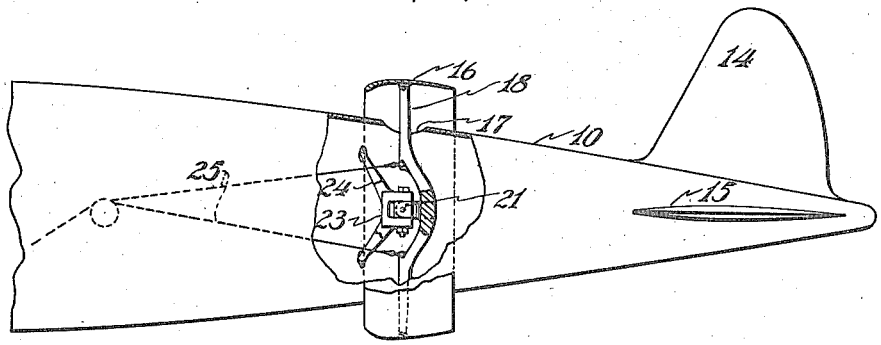
Fig. 2 is an enlarged view of the tail portion of the aircraft fuselage, partly broken away to show the details of the mechanism.

Cables 25 are clevised to the opposite vertical arms 18, and cables 26 are clevised to the opposite horizontal arms 18, the respective sets of cables passing forwardly over suitable pulleys to a control stick 27 and rudder pedals 28, as indicated diagrammatically in Fig. 1.

In operation, the control stick 27 serves to swing the annular airfoil 16 bodily about the horizontal axis 20, while the rudder pedals 28 serve to swing the airfoil 16 bodily about the vertical axis 22. The section of the air foil 16 is so disposed, that when the airfoil is normal to the fuselage axis, the slipstream of air passing over the fuselage will address the airfoil at such an attitude that a minimum of lift and a minimum of drag are produced. Ordinarily, the airflow at the rearward portion of the fuselage will be substantially parallel to the fuselage surface, and the section of the airfoil 16 should be arranged at substantially zero angle of attack with respect to the relative airflow thereover. When the airfoil 16 is tilted from its normal position, one side of the annular airfoil will address the relative airflow at a positive angle of attack, whereby a high coefficient of lift is produced, tending to swing the fuselage toward the direction of high angle of attack. The other side of the annular airfoil 16 moves to a position of negative angle of attack, whereat no lift, little lift or negative lift is produced. Accordingly, there will be a resultant lift force produced by the annular airfoil which will effect steering of the aircraft. The drag coefficients on that side of the ring which is moved to a high angle of attack position, will be increased and, according to the order of angle of attack when the annular airfoil is in its normal position, the drag on the opposite side of the ring may either increase or decrease. In any case, the drag occasioned by the annular airfoil will be small, while the steering force will be adequate to effect proper control of the aircraft.

Figure 5:
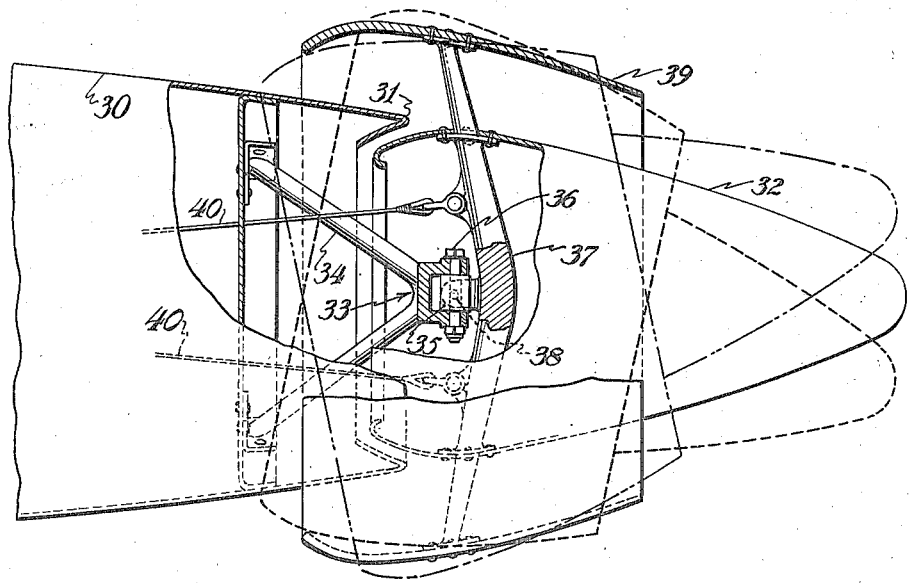
Fig. 5 is a fragmentary side elevation, partly broken away, showing an alternative embodiment of the invention.
Figure 6:
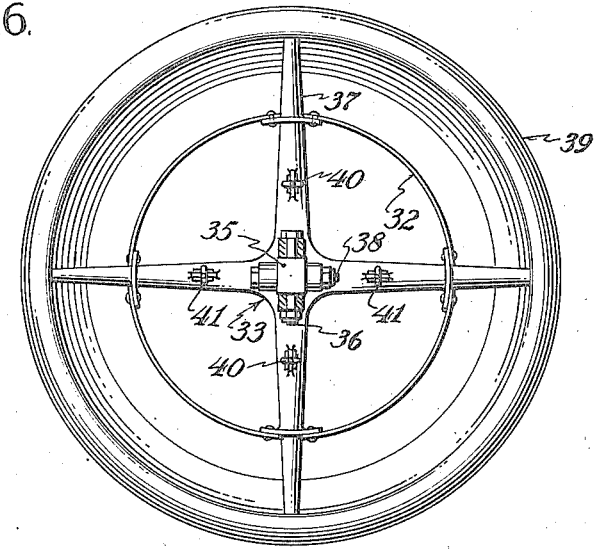
Fig. 6 is a front view of the alternative embodiment of Fig. 5.

Figs. 5 and 6 show an alternative organization wherein the fuselage 30 terminates at 31, and a streamline prolongation 32 for the fuselage is universally pivoted thereto at 33, through the medium of a fixed spider 34 to which a block 35 is pivoted on a vertical axis 36, and to which block, a spider 37 is pivoted on a horizontal axis 38. To the spider is fixedly attached the member 32, and an annular airfoil 39, essentially similar to the annular airfoil 16 of the previous embodiment, is also carried by the spider 37, the annular airfoil being in spaced relation at all times to the member 32, and being in spaced relation to the fuselage 30 when the airfoil is in its neutral position. Control cables 40 and 41 are attached to the spider 37 and lead forwardly to the pilot's compartment for attachment to a suitable control stick and rudder pedals. The operation of the embodiment of Figs. 5 and 6 is essentially the same as that in the first embodiment, but the movable tail portion 32 in addition to aiding the annular airfoil 39 in aircraft control, acts as both a vertical and horizontal stabilizer under normal flight conditions.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications and changes.

What is claimed is:

1. A control system for aircraft having a streamlined, elongated, substantially circular fuselage having a forwardly disposed main lifting surface, comprising a ring member of airfoil profile, concentrically disposed around said fuselage toward a rearward portion thereof, brace means for connecting said ring to the fuselage, means to selectively tilt said ring relative to said fuselage about vertical and lateral axes respectively, and fixed stabilizing means rearward of said ring member.

2. In a control system for an aircraft having a streamlined fuselage extending rearwardly from a main lifting surface, a fuselage tail unit formed to continue the streamline form of said fuselage, mounting means connecting said unit to said fuselage for universal movement of the unit, and an airfoil embracing, mounted on and movable with said unit.

3. In a control system for an aircraft having a streamlined fuselage extending rearwardly from a main lifting surface, a fuselage tail unit formed to continue the streamline form of said fuselage, mounting means connecting said unit to said fuselage for universal movement of the unit, an airfoil embracing, mounted on and movable with said unit, and control means for controlling the movement of said unit.

4. In a substantially circular monocoque fuselage, a plurality of members extending inwardly from the fuselage skin to a common junction on the fuselage axis, a member universally mounted on said junction having arms extending outwardly beyond the fuselage skin, and an annular airfoil carried by said arms for universal movement with said member.

5. In a substantially circular monocoque fuselage, a plurality of members extending inwardly from the fuselage skin to a common junction on the fuselage axis, a member universally mounted on said junction having arms extending outwardly beyond the fuselage skin, an annular airfoil carried by said arms for universal movement with said member, and means for controlling the movement of said member and airfoil.

ARTHUR G. BUTLER.